No. 789,177. PATENTED MAY 9, 1905.
G. M. SMITH.
HAY FORK.
APPLICATION FILED FEB. 7, 1905.
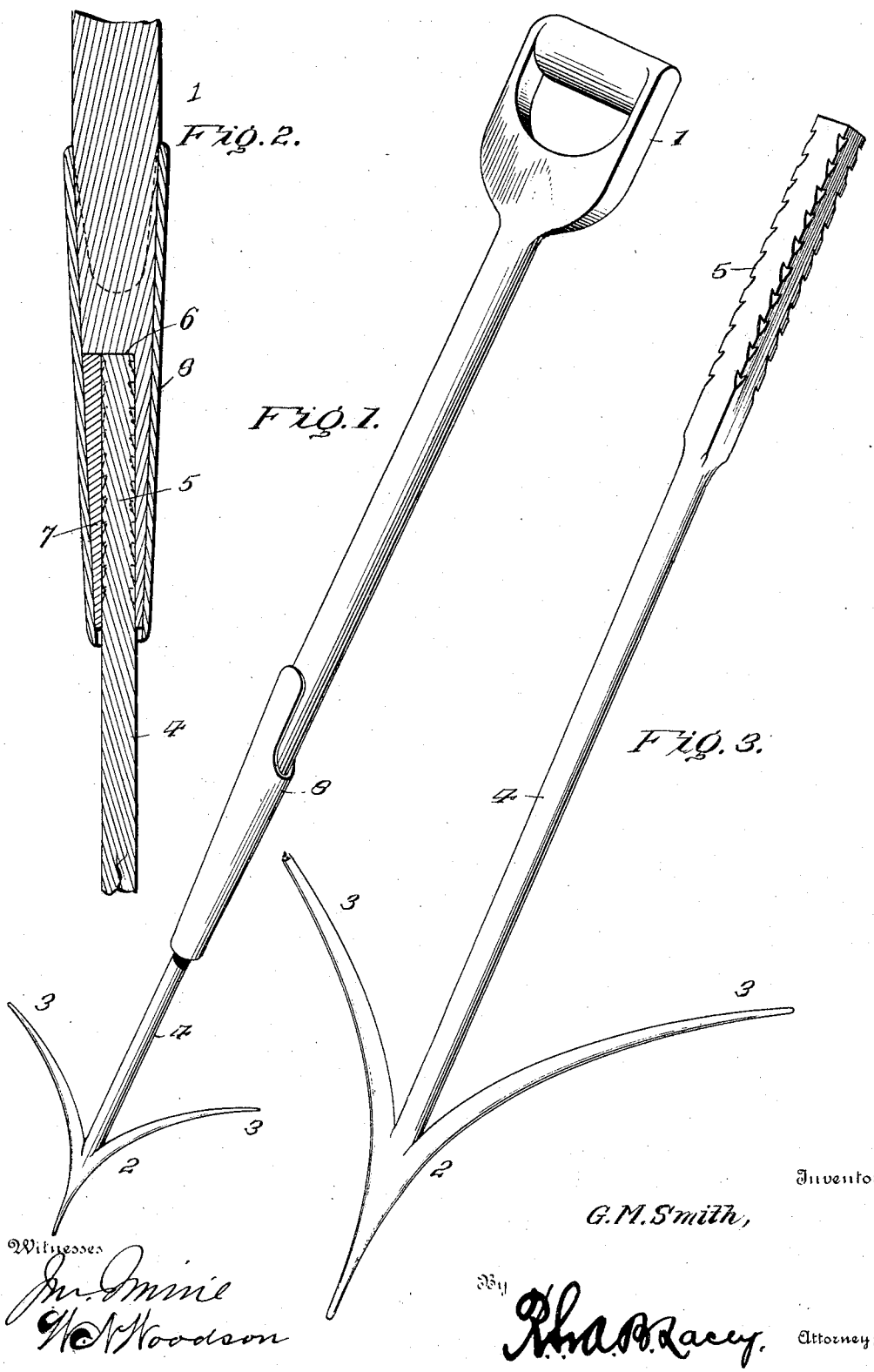
Inventor
G. M. Smith, No. 789,177.                                                    Patented May 9, 1905.

UNITED STATES PATENT OFFICE.

GEORGE MARTIN SMITH, OF IVANHOE, COLORADO.

HAY-FORK.

SPECIFICATION forming part of Letters Patent No. 789,177, dated May 9, 1905.

Application filed February 7, 1905. Serial No. 244,668.

*To all whom it may concern:*

Be it known that I, GEORGE MARTIN SMITH, a citizen of the United States, residing at Ivanhoe, in the county of Pitkin and State of Colorado, have invented certain new and useful Improvements in Hay-Forks, of which the following is a specification.

The object of this invention is to provide a simple form of implement for farm purposes and designed chiefly for pulling hay from the body of a stack.

It is often desirable to remove hay from the lower portion or base of a stack rather than from the top thereof, because the hay at the top is often wet or not in good condition, due to exposure to the elements, and the implement which constitutes this invention is especially designed for facilitating the pulling of the hay from the body of the stack, as above premised.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view of an implement embodying the invention. Fig. 2 is a vertical longitudinal sectional view. Fig. 3 is a perspective view of the fork member of the implement.

Corresponding and like parts are referred to in the following description and indicated in all the views of the drawings by the same reference characters.

In carrying out the invention the main parts of the implement comprise a handle 1 and a fork 2. The handle 1 may be of any suitable type having a hand-grip at one end, if desirable, and is of a length adapted for the purposes of the invention. The fork member 2 is of somewhat arrow-head formation having the rearwardly and outwardly curved prongs 3, shaped particularly with reference to their pulling function in removing hay or like material in the actual use of the implement. The fork member 2 has a shank 4, which shank 4 is preferably squared at one end, as shown at 5, the squared portion 5 being longitudinally roughened for purposes which will appear hereinafter.

The handle 1 is connected with the shank of the fork member 2, and the means for attaching these parts comprises an essential feature of the invention. The end of the handle 1, attached directly to the fork member 2, is formed with a longitudinal recess 6 of approximately rectangular form in cross-section, and this recess receives the square portion 5 of the shank 4 of said fork member 2. The recess 6 is of a size somewhat greater than the sectional area of the portion 5 of the shank 4 in order that said recess may receive a key or wedge member 7 in addition to the said shank. The key or wedge member 7 is of a length substantially the length of the recess 6, and said member is tapered slightly toward one end, and its outer side is about flush with the outer portion of the handle when the member 7 is in position. The square portion 5 of the shank 4 is received in the recess 6, and then the wedge member 7 is placed within the recess, so that the portion 5 of the shank 4 is housed or inclosed upon all sides.

In order to hold the parts 4 and 7 from displacement from the handle 2, a sleeve 8 is used, which sleeve is somewhat longer than the recess 6 of the handle 1, being adapted to receive the end portion of the handle in which the said recess is formed. The end of the handle 1 received by the sleeve 8 is of slightly-tapered construction, and the outer extremity of the sleeve 8 is of similar form, so that when the sleeve is forced upon the end portion of the handle 1 after the wedge member 7 of the shank 4 has been disposed in the recess 6 said sleeve will frictionally bind against the sides of the handle in such a manner as to effectively prevent displacement of the parts 7 and 4. The sleeve 8 is of a size sufficient to be readily grasped by the hand, and the great frictional contact of the sleeve with the handle 1 is sufficient to prevent the sleeve from being displaced.

The form of the handle 1 and the means for attaching said handle to the fork member 2 do not interfere with the operation of the device when forcing the fork member 2 into the body of the stack preparatory to withdrawal of the implement with a certain amount of hay. The exact formation of the fork 2 is also advantageous in attaining the purpose of the invention.

It will be readily seen that the parts of the implement may be readily separated or taken apart for packing purposes or when the device is not in use, the knocked-down construction of the same being adapted to economize space, as well as possessing various other advantages.

Having thus described the invention, what is claimed as new is—

In an implement of the class described, the combination of a handle tapering toward one end and recessed longitudinally at the tapered portion, a fork member embodying a shank received in the recess of the handle, a tapered key or wedge member engaging the shank and mounted in the recess of the handle, and a sleeve tapering near one end and slipped upon the handle, coöperating with the handle and the wedge member aforesaid to prevent displacement of the fork member from the handle.

In testimony whereof I affix my signature in presence of two witnesses.

GEORGE MARTIN SMITH. [L. S.]

Witnesses:
JOHN EISKHTI,
JULIUS E. KOEHLER.